United States Patent
Periyasamy et al.

(10) Patent No.: US 9,465,722 B2
(45) Date of Patent: Oct. 11, 2016

(54) ERROR ASSESSMENT TOOL

(71) Applicant: BANK OF AMERICA CORPORATION, Charlotte, NC (US)

(72) Inventors: Muthusamy Periyasamy, Andhra Pradesh (IN); Manoj Kumar Singh, Andhra Pradesh (IN); Solomon Anand Raj Ambrose, Tamil Nadu (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 177 days.

(21) Appl. No.: 14/336,780

(22) Filed: Jul. 21, 2014

(65) Prior Publication Data

US 2016/0019134 A1    Jan. 21, 2016

(51) Int. Cl.
*G06F 11/36*    (2006.01)

(52) U.S. Cl.
CPC .................. *G06F 11/3664* (2013.01)

(58) Field of Classification Search
USPC .......................................................... 714/46
See application file for complete search history.

(56) References Cited

U.S. PATENT DOCUMENTS

| | | | | |
|---|---|---|---|---|
| 6,526,371 B1* | 2/2003 | Klein | ................. | G06F 11/3419 702/119 |
| 7,386,839 B1* | 6/2008 | Golender | ............ | G06F 11/3636 717/127 |
| 7,770,057 B1* | 8/2010 | Graham | .............. | G06F 11/1464 714/6.12 |
| 2004/0078695 A1* | 4/2004 | Bowers | ............... | G06F 11/0781 714/39 |
| 2006/0150018 A1* | 7/2006 | Cousin | ............... | G05B 23/0248 714/26 |
| 2007/0038946 A1* | 2/2007 | Grieshaber | ........ | H04N 1/00464 715/762 |
| 2008/0172583 A1* | 7/2008 | Mahajan | ............. | G06F 11/3672 714/57 |
| 2012/0311538 A1* | 12/2012 | Bhatia | ................. | G06F 11/3664 717/126 |
| 2014/0245268 A1* | 8/2014 | Golender | ............ | G06F 11/3636 717/128 |

* cited by examiner

*Primary Examiner* — Kamini Patel
(74) *Attorney, Agent, or Firm* — Michael A. Springs; Moore & Van Allen PLLC; W. Kevin Ransom

(57) ABSTRACT

Embodiments of the invention are directed to a system, method, and computer program product for assessing error notifications associated with one or more application functions. An exemplary embodiment includes receiving an indication of an error associated with at least one function in an application; extracting information associated with the application from one or more sources; and initiating a presentation of a second user-interface to enable a user to resolve the error, wherein the second user-interface comprises at least one of an aggregation of the information extracted from the one or more sources.

18 Claims, 11 Drawing Sheets

ERROR ASSESSMENT TOOL

BACKGROUND

The modern enterprise relies on web based application interfaces to provide information and services to its customers, partners, and suppliers. As dependence on this medium increases, so increases the need to have this interaction with the entity be a positive experience. The most efficient entities today have an active program in place to monitor and manage their applications and interfaces. Entities with a larger footprint in the web-space require multiple monitors to manage and maintain the application. An error notification in one of the monitors may require immediate remedial action to ensure seamless operation. There is a need for a system to assess error notifications associated with one or more application functions and determine remediation steps to resolve the error.

BRIEF SUMMARY

Embodiments of the present invention resolve the above needs and/or achieve other advantages by providing apparatuses (e.g., a system, computer program product, and/or other device) and methods for assessing error notifications associated with one or more application functions and determining remediation steps to resolve the error.

Embodiments of the present invention include systems, computer program products, and methods for assessing error notifications associated with one or more application functions and determining remediation steps to rectify the error.

A system for assessing error notifications associated with one or more application functions and determining remediation steps to rectify the error defines first embodiments of the invention. The apparatus includes a memory, a processor and a module stored in the memory that is executable by the processor. The module is configured to receive an indication of an error associated with at least one function in an application. The application is dynamically hosted by one or more servers that are associated with a back-end system. The module is further configured to extract information associated with the application from one or more sources. The information includes at least one of one or more known errors associated with the at least one (a) function, (b) one or more resolutions associated with the one or more known errors, and/or (c) impacts associated with the at least one function. The module is further configured to initiate a presentation of a second user-interface to enable a user to begin an error resolution process. The second user-interface includes at least one of an aggregation of the information extracted from the one or more sources, a summary of the error, an error type, and/or access to one or more tools used to resolve the error.

In some embodiments of the system, the module is further configured to initiate a presentation of a first interface to: (a) analyze the one or more servers hosting the application; (b) identify an error in the one or more servers that is associated with the error indicated in the at least one function in the application; and (c) begin an error resolution process based on at least predetermined resolution functions associated with the one or more servers.

In some embodiments of the system, the module is further configured to analyze at least one of a utility, one or more services, server clustering information, and/or memory usage.

In some embodiments of the system, the one or more sources include an internal source and an external source. In such embodiments of the system, the internal source includes at least one of application production statistics, internal communication reports, application documentation, and/or application production trials, and the external source includes at least one of external communication reports, trade literature, and/or one or more databases associated with an application type.

In some embodiments of the system, the module is further configured to (a) aggregate the information from the one or more sources periodically and (b) store the aggregated information in a database associated with the application. Further the aggregated information is retrievable from the database by the user to be presented in the first user-interface.

In some embodiments of the system, an application function includes one or more application sub-functions. In such embodiments of the system, the indication of an error associated with at least one application function includes an error associated with one or more application sub-functions associated with the at least one application function.

In some embodiments of the system, the first user-interface further includes at least one of information associated with the application development team, application support team, and/or one or more vendors.

In some embodiments of the system, the module is further configured to (a) determine that the error associated with the at least one function in the application is not associated with the back-end system, (b) initiate an external communication with one or more vendors associated with the application indicating the error to determine that the error associated with the at least one function is to be resolved by the one or more vendors and (b) initiate an error resolution process with the one or more vendors associated with the application.

In some embodiments of the system, the module is further configured to receive an indication of the error based on at least a real-time monitoring of the one or more application functions associated with the one or more applications.

A method for assessing error notifications associated with one or more application functions and determining remediation steps to resolve the error, defines second embodiments of the invention. The method includes receiving an indication of an error associated with at least one function in an application. The application is dynamically hosted by one or more servers that are associated with a back-end system. The method further includes extracting information associated with the application from one or more sources. The information includes at least one of (a) one or more known errors associated with the at least one function, (b) one or more resolutions associated with the one or more known errors, and/or (c) impacts associated with the at least one function. The method further includes initiating a presentation of a second user-interface to enable a user to resolve the error. The second user-interface includes at least one of (a) an aggregation of the information extracted from the one or more sources, (b) a summary of the error, (c) an error type, and/or (d) access to one or more tools used to resolve the error.

A computer program product for assessing error notifications associated with one or more application functions and determining remediation steps to resolve the error, defines third embodiments of the invention. The computer program product includes a non-transitory computer-readable medium including code causing a computer to receive an indication of an error associated with at least one function in an application. The application is dynamically hosted by one or more servers that are associated with a back-end system.

The computer-readable medium additionally includes code for causing a computer to extract information associated with the application from one or more sources. The information includes at least one of (a) one or more known errors associated with the at least one function, (b) one or more resolutions associated with the one or more known errors, and/or (c) impacts associated with the at least one function. The computer-readable medium additionally includes code for causing a computer to and initiate a presentation of a second user-interface to enable a user to resolve the error. The second user-interface includes at least one of an aggregation of the information extracted from the one or more sources, a summary of the error, an error type, and/or access to one or more tools used to resolve the error.

BRIEF DESCRIPTION OF THE DRAWINGS

Figure 1:
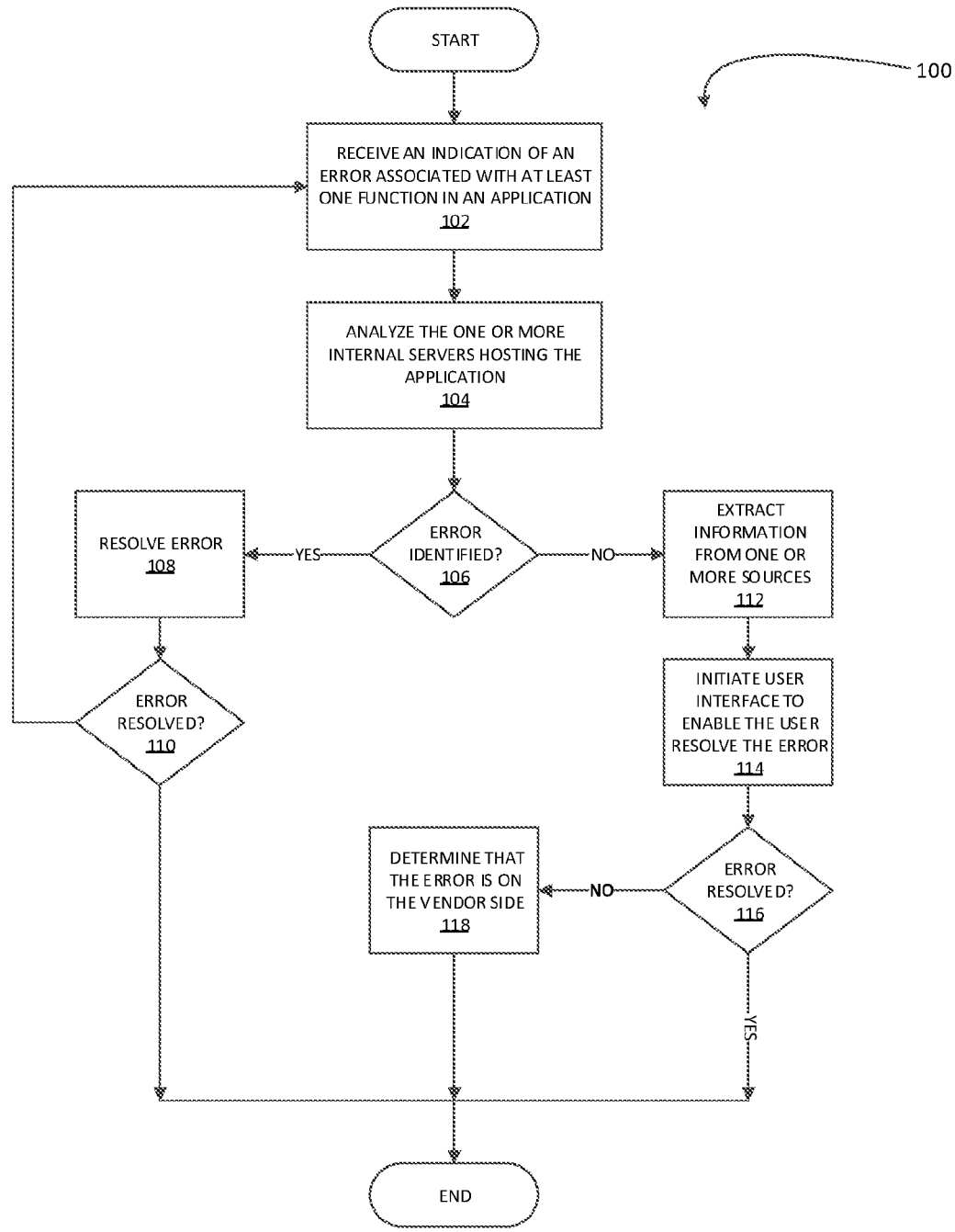

Having thus described embodiments of the invention in general terms, reference will now be made to the accompanying drawings, where:

FIG. 1 presents a flow diagram of a method for the error assessment, in accordance with an embodiment of the invention.

Figure 2:
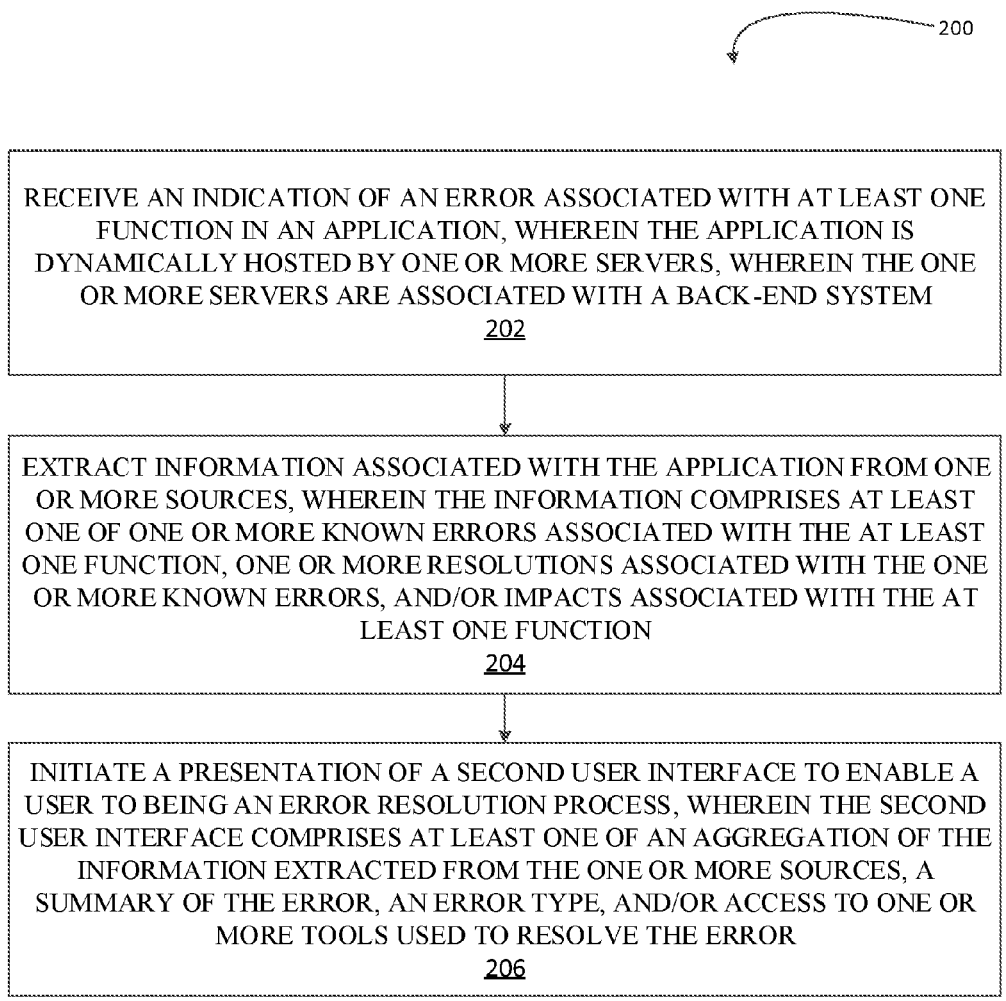

FIG. 2 illustrates a high level process flow of a method for error assessment, in accordance with an embodiment of the invention.

Figure 3:
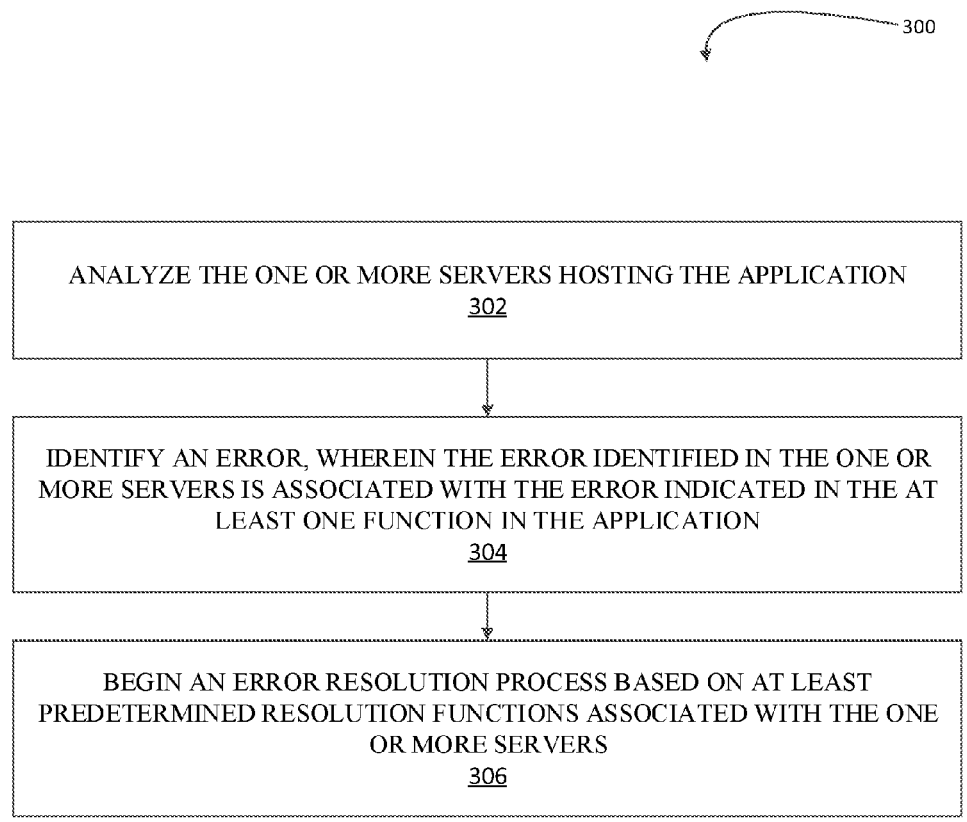

FIG. 3 presents a process flow for a method for analyzing the servers for an error resolution, in accordance with an embodiment of the invention.

Figure 4:
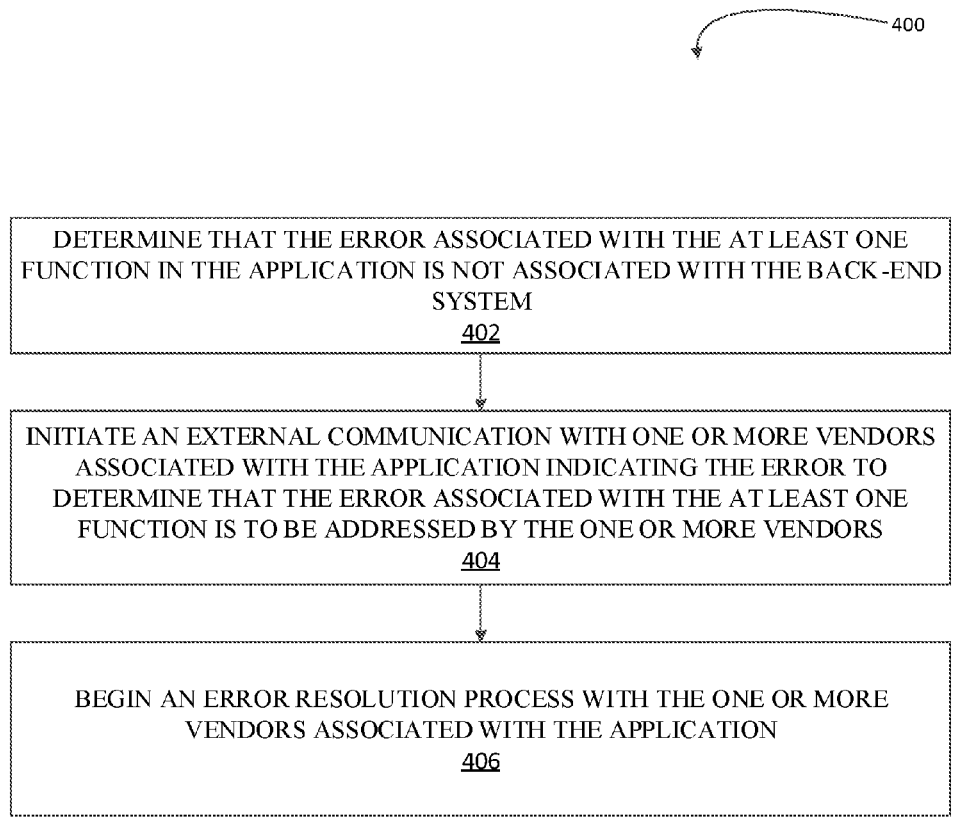

FIG. 4 presents a process flow for a method for escalating an error, in accordance with one embodiment of the invention.

Figure 5:
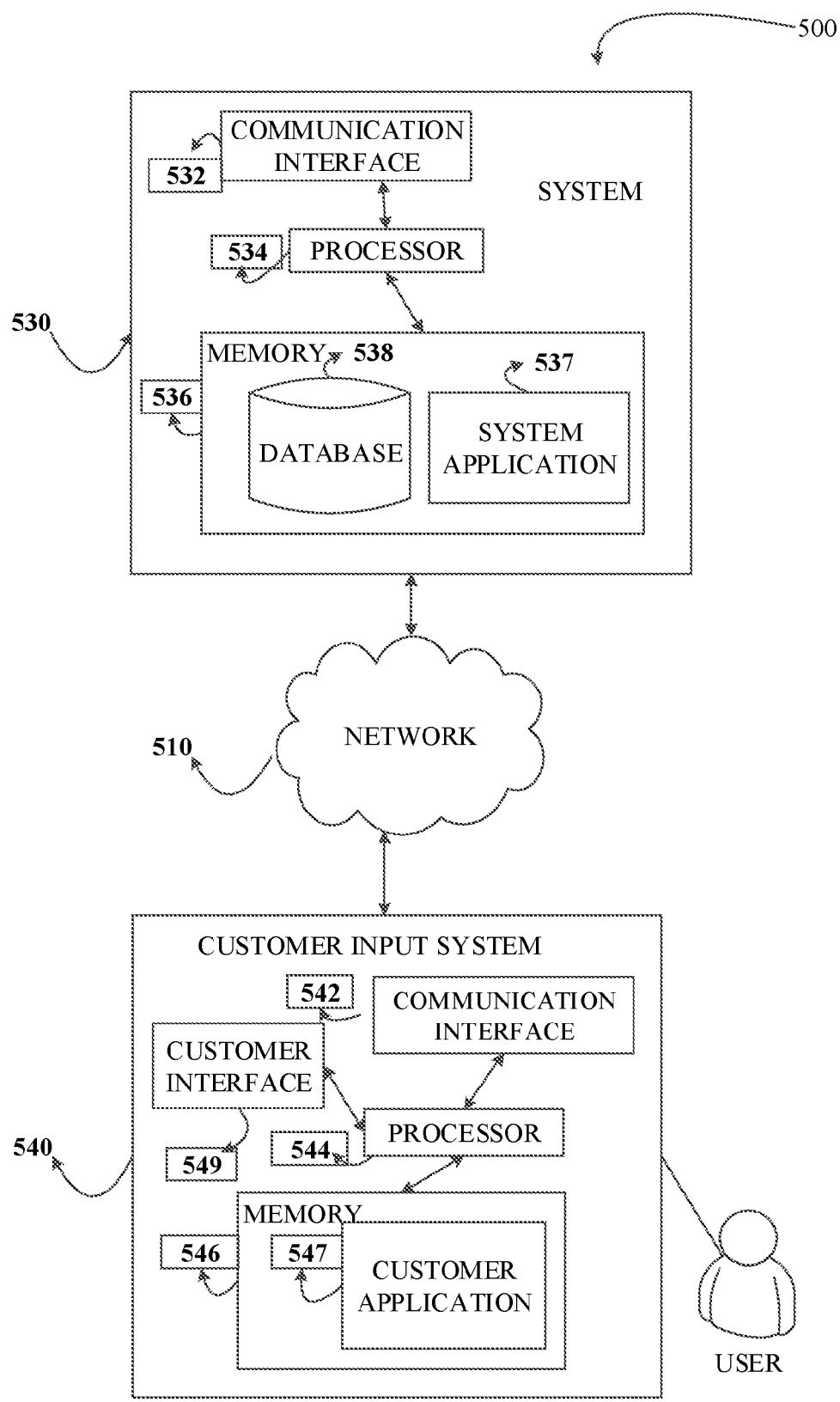

FIG. 5 presents an exemplary block diagram of a system environment for implementing the process flows described herein, in accordance with embodiments of the present invention.

Figure 6:
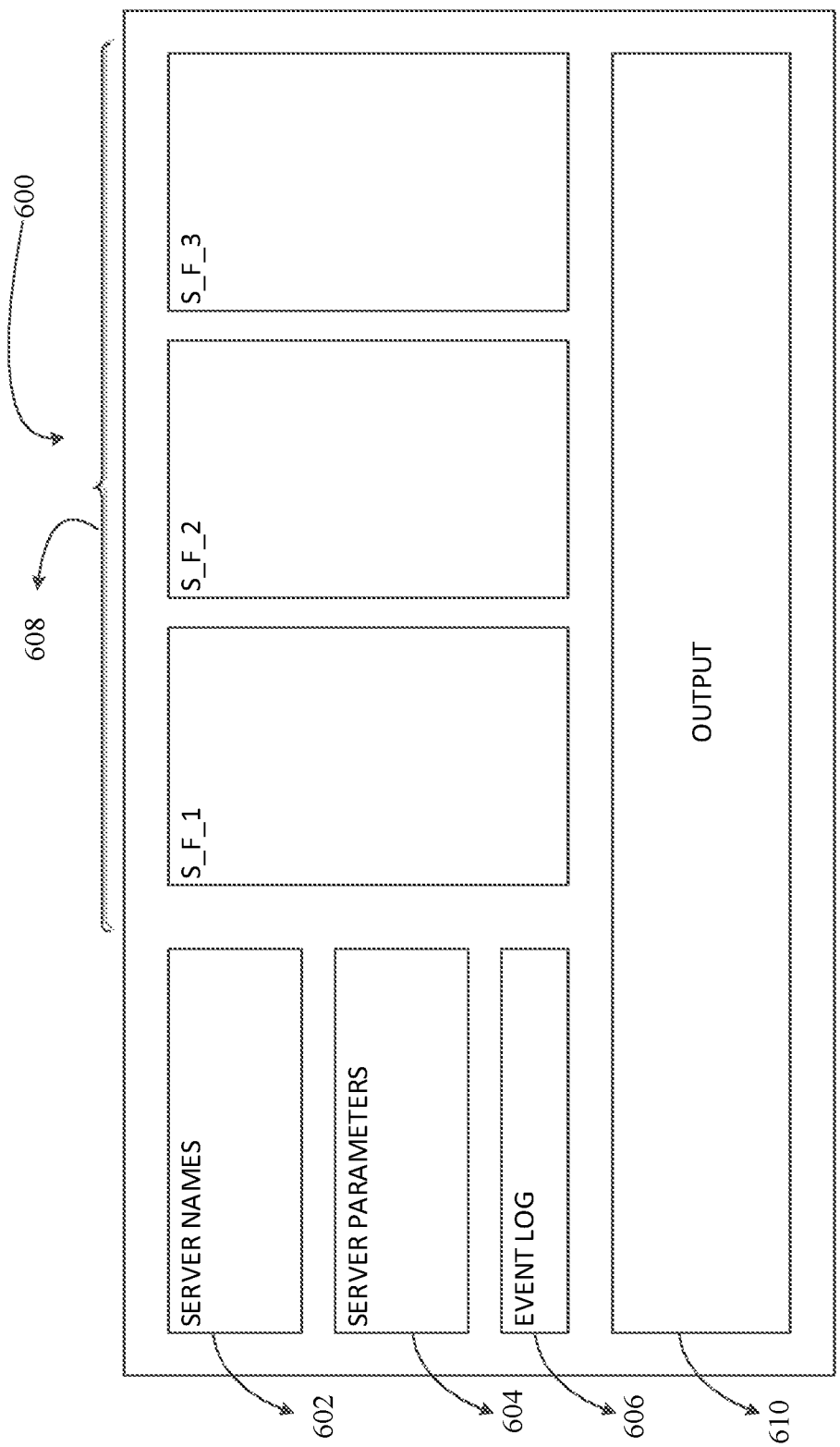

FIG. 6 illustrates an exemplary embodiment of a first user-interface, in accordance with one aspect of the invention.

FIGS. 7A, 7B, 7C, 7D, and 7E present an exemplary embodiment of a second interface, in accordance with an embodiment of the invention

DETAILED DESCRIPTION OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Traditionally, application performance management was quite limited to components monitoring and reactive troubleshooting. Increased application complexity and increasing market pressure has necessitated innovation in the application performance management approach. A more proactive approach towards application performance management may be used to overcome the disadvantages of the traditional approach.

A real-time graphical monitor is the lowest common denominator required for any advanced application monitoring system. It helps in rapid identification of issues. An issue may typically originate in any component/layer of the application and manifest in components and layers across the application. For example, a severely degraded database response may reflect as an exhausted connection pool or CPU (Central Processing Unit) utilizations approaching 100 percent may manifest as degraded response time. Hence, information across all layers and components needs to be monitored and reported for reliable issue identification. Given the limitations of manual monitoring, tracing/monitoring multiple application metrics in real-time may be a viable and advantageous option. In addition, the monitors may be configured to set performance thresholds depending on the architecture complexity and business criticality of the application.

In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a customer to establish an account with the entity. An "account" may be the relationship that the customer has with the entity. Examples of accounts include a deposit account, such as a transactional account (e.g. a banking account), a savings account, an investment account, a money market account, a time deposit, a demand deposit, a pre-paid account, a credit account, a non-monetary customer profile that includes only personal information associated with the customer, or the like. The account is associated with and/or maintained by an entity. In other embodiments, an "entity" may not be a financial institution.

In some embodiments, a "user" may be a financial institution employee (e.g., an underwriter, a project manager, an information technology specialist, a manager, an administrator, an internal operations analyst, bank teller, or the like). In one aspect, an employee may be part of an application development and monitoring team. For purposes of the present invention, an employee in a business environment (e.g., financial institution) may be considered as the "user" of the system, method, and computer program product described herein.

FIG. 1 presents a flow chart for a method 100 for error assessment, in accordance with an embodiment of the invention. As shown, at Event 102, the system receives an indication of an error associated with at least one function in an application. Typically, this indication may be received from a real-time application monitoring system. In some embodiments, the application monitoring system may be configured to monitor one or more applications and the one or more functions associated with the one or more functions in real-time around the clock. In one aspect, each function may have one or more sub-functions.

For example, a web-based financial application may require verification of a user's authentication credentials to enable a user to access the application. In this regard, the web-based financial application may include a login functionality, whereby the application initiates the presentation of a user-interface to the user to receive one or more authentication credentials. In this case, the login page may be considered a function of the overall web-based application. Further, the login page may include one or more sub-functions such as the login option, forgot password option, forgot username option, or the like. The real-time monitoring system is typically configured to monitor the application (web-based financial application), the one or more functions associated with the application (login page), and the one or more sub-functions associated with the function (login, forgot username, forgot password). In some embodiments, when one or more monitored functions or sub-functions malfunction, the application monitoring system may indicate an error. An indication of this error is received by the system to initiate the process flow.

At Event 104, in response to receiving an indication of an error, one or more internal servers hosting the application are analyzed. In the above example, depending on the nature of the web-based application and the user traffic, the system may be configured to host the application partially among multiple servers. Once the indication is received, the system may be configured to run one or more diagnostic tests on the servers hosting the application at that time to determine whether the error is associated with a malfunction in the one or more servers in the back-end system.

At Decision 106, once the server diagnostics are performed, a determination is made as to whether the error is identified. The server diagnostic test may enable the user to determine which of the one or more servers hosting the application shows an error. In one aspect, a server error may be indicated by an error notification (e.g., a color-coded error indicator or the like) to differentiate from other typical diagnostic results. If the error has been identified, at Event 108, the user is enabled to resolve the error. In one aspect, the system may enable the user to perform one or more actions to facilitate the resolution of the one or more servers indicating an error. In this regard, the user may restart the one or more servers indicating an error or restart the one or more servers hosting the application. If the error is not resolved, the user may perform one or more manual troubleshooting procedures to resolve the error.

At Decision 110, in response to the user's actions, a determination is made as to whether the error has been resolved. If the error has been resolved, the process flow terminates. In some cases, prior to proceeding to an alternative path, the system may be configured to restart the application monitoring system to ensure that the real-time monitoring system indicating the error is functioning appropriately.

As shown in FIG. 1, if the error is not identified based on the analysis of the one or more internal servers, at Event 112, information is extracted from one or more sources. The one or more sources may include internal and external information associated with the application. Once the information is extracted, at Event 114, a presentation of a user-interface is initiated to enable the user to begin an error resolution process. In some embodiments, the error resolution process may include manual analysis of the error on a "case-by-case" basis. In some other embodiments, based on the nature of the error, the error resolution process may include one or more predetermined steps to be followed by the user. At Decision 116, a determination is made as to whether the error has been resolved. If the error is resolved, the process flow terminates. In one aspect, if the error is still not resolved, then, at Event 118, the process flow the error may be determined to be on the vendor side and escalation of the issue with the vendor ensues to begin an error resolution process.

FIG. 2 illustrates a high level process flow of a method 200 for the error assessment tool, in accordance with an embodiment of the invention. At Event 202, an indication of an error associated with at least one function in an application is received. The application is dynamically hosted by one or more servers that are associated with a back-end system.

At Event 204, in response to receiving an indication of the error, information associated with the application is extracted from one or more sources. The information includes at least one of (a) one or more known errors associated with the at least one function, (b) one or more resolutions associated with the one or more known errors, and/or (c) impacts associated with the at least one function.

At Event 206, once the information has been extracted from one or more sources, a presentation of a second user-interface is initiated to enable a user to begin an error resolution process. The second user-interface includes at least one of (a) an aggregation of the information extracted from the one or more sources, (b) a summary of the error, (c) an error type, and/or (d) access to one or more tools used to resolve the error.

In some embodiments, the one or more sources of information include an internal source and an external source. In one aspect the internal source includes at least one of application production statistics, internal communication reports, application documentation, and/or application production trials. In another aspect, the external source includes at least one of external communication reports, trade literature, and/or one or more databases associated with an application type. In some embodiments, the system may be configured to aggregate the information from the one or more sources periodically. In response to aggregating the information from the one or more sources, the system may be configured to store the aggregated information in a database associated with the application, such that the aggregated information is retrievable by the user.

In some embodiments, the second user-interface includes an overview tab, a summary tab, a resolution tab, a known error tab, and an attachment tab. In one aspect, the second user-interface enables the user to begin an error resolution process. In one aspect, the information may be manually extracted from the one or more sources by the user. In another aspect, the information may be retrieved using a data extraction process. Typically, data extraction is the process of retrieving data out of (usually unstructured or poorly structured) data sources for further data processing and/or data storage. Usually, the term data extraction is applied when the information is imported into a computer from one or more sources (internal and/or external). In one aspect, the act of adding structure to unstructured data may be done by using a text pattern matching such as regular expressions to identify small or large-scale structure (e.g., records in a report and their associated data from headers and footers), a table-based approach to identify common sections within a limited domain (e.g., in emails), using text analytics to attempt to understand the text and link it to other information, or the like. In this regard, the system may be configured to extract information from one or more sources within the organization and populate a database to provide the user with adequate prior information to begin a resolution process to rectify the error.

FIG. 3 presents a process flow for a method 300 for analyzing the servers for an error resolution, in accordance with embodiments of the present invention. At Event 302, one or more servers hosting the application are analyzed. In one aspect, analyzing one or more servers includes executing one or more diagnostic tests on the one or more servers hosting the application. In some embodiments, the one or more diagnostic test options include but are not limited to utilities, services, cluster information, inventory, memory/process, Internet Information Services (IIS)/Application Pool, and certificates. The system may be configured to enable a user to run diagnostic tests based on the one or more diagnostic test options to determine whether the one or more servers hosting the application are functioning accordingly.

At Event 304, in response to analyzing the one or more servers, an error is identified. In one aspect, the error identified with the one or more servers hosting the application is associated with the error indication received by the system. In some embodiments, the error identified with the one or more servers hosting the application may be causing the error in the one or more application functions. At Event 306, once the error has been identified, an error resolution process may be initiated based on at least predetermined resolution functions associated with the one or more servers. In one aspect, a predetermined resolution function may include resetting the one or more servers.

FIG. 4 presents a process flow for a method 400 for escalation of the error, in accordance with one embodiment of the invention. At Event 402, the error associated with the at least one function in the application is determined to be not associated with the back-end system. At Event 404, in such situations, an external communication is initiated with the one or more vendors associated with the application indicating the error. The communication is configured to indicate that the error associated with the at least one function is to be addressed by the one or more vendors. At Event 406, in response, the user and the one or more vendors are enabled to begin an error resolution process associated with the application. In some embodiments, escalating the error to the one or more vendors may include transmitting the information extracted from the one or more sources to the one or more vendors.

FIG. 5 presents an exemplary block diagram of the system environment 500 for implementing the process flows described herein in accordance with embodiments of the present invention. As illustrated, the system environment 500 includes a network 510, a system 530, and a user-input system 540. Also shown in FIG. 5 is a user of the user-input system 540. The user-input system 540 may be a mobile device or other non-mobile computing device. The user may be a person who uses the user-input system 540 to execute a user application 547. The user application 547 may be an application to communicate with the system 530, perform a transaction, input information onto a user-interface presented on the user-input system 540, or the like. The user application 547 and/or the system application 537 may incorporate one or more parts of any process flow described herein.

As shown in FIG. 5, the system 530, and the user-input system 540 are each operatively and selectively connected to the network 510, which may include one or more separate networks. In addition, the network 510 may include a telecommunication network, local area network (LAN), a wide area network (WAN), and/or a global area network (GAN), such as the Internet. It will also be understood that the network 510 may be secure and/or unsecure and may also include wireless and/or wired and/or optical interconnection technology.

The user-input system 540 may include any computerized apparatus that can be configured to perform any one or more of the functions of the user-input system 540 described and/or contemplated herein. For example, the user may use the user-input system 540 to transmit and/or receive information or commands to and from the system 530. In some embodiments, for example, the user-input system 540 may include a personal computer system (e.g., a non-mobile or non-portable computing system, or the like), a mobile computing device, a personal digital assistant, a mobile phone, a tablet computing device, a network device, and/or the like.

As illustrated in FIG. 5, in accordance with some embodiments of the present invention, the user-input system 540 includes a communication interface 542, a processor 544, a memory 546 having an user application 547 stored therein, and a user-interface 549. In such embodiments, the communication interface 542 is operatively and selectively connected to the processor 544, which is operatively and selectively connected to the user-interface 549 and the memory 546. In some embodiments, the user may use the user application 547 to execute processes described with respect to the process flows described herein. Specifically, the user application 547 executes the process flows described herein.

Each communication interface described herein, including the communication interface 542, generally includes hardware, and, in some instances, software, that enables the user-input system 540, to transport, send, receive, and/or otherwise communicate information to and/or from the communication interface of one or more other systems on the network 510. For example, the communication interface 542 of the user-input system 540 may include a wireless transceiver, modem, server, electrical connection, and/or other electronic device that operatively connects the user-input system 540 to another system such as the system 530. The wireless transceiver may include a radio circuit to enable wireless transmission and reception of information. Additionally, the user-input system 540 may include a positioning system. The positioning system (e.g., a global positioning system (GPS), a network address (IP address) positioning system, a positioning system based on the nearest cell tower location, or the like) may enable at least the user-input system 540 or an external server or computing device in communication with the user-input system 540 to determine the location (e.g., location coordinates) of the user-input system 540.

Each processor described herein, including the processor 544, generally includes circuitry for implementing the audio, visual, and/or logic functions of the user-input system 540. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 547 of the memory 546 of the user-input system 540.

Each memory device described herein, including the memory 546 for storing the user application 547 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 5, the memory 546 includes the user application 547. In some embodiments, the user application 547 includes an interface for communicating with, navigating, controlling, configuring, and/or using the user-input system 540. In some embodiments, the user application 547 includes computer-executable program code portions for instructing the processor 544 to perform one or more of the functions of the user application 547 described and/or contemplated herein. In some embodiments, the user application 547 may include and/or use one or more network and/or system communication protocols.

Also shown in FIG. 5 is the user-interface 549. In some embodiments, the user-interface 549 includes one or more output devices, such as a display and/or speaker, for presenting information to the user. In some embodiments, the user-interface 549 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user. In some embodiments, the user-interface 549 includes the input and display devices of a mobile device, which are operable to receive and display information.

FIG. 5 also illustrates a system 530, in accordance with an embodiment of the present invention. The system 530 may refer to the "apparatus" described herein. The system 530 may include any computerized apparatus that can be configured to perform any one or more of the functions of the system 530 described and/or contemplated herein. In accordance with some embodiments, for example, the system 530 may include a computer network, an engine, a platform, a server, a database system, a front end system, a back end system, a personal computer system, and/or the like. Therefore, the system 530 may be a server managed by the entity. The system 530 may be located at the facility associated with the entity or remotely from the facility associated with the entity. In some embodiments, such as the one illustrated in FIG. 5, the system 530 includes a communication interface 532, a processor 534, and a memory 536, which includes a system application 537 and a structured database 538 stored therein. As shown, the communication interface 532 is operatively and selectively connected to the processor 534, which is operatively and selectively connected to the memory 536.

It will be understood that the system application 537 may be configured to implement any one or more portions of the various user-interfaces and/or process flow described herein. The system application 537 may interact with the user application 547. It will also be understood that, in some embodiments, the memory includes other applications. It will also be understood that, in some embodiments, the system application 537 is configured to communicate with the structured database 538, the user-input system 540, or the like.

It will be further understood that, in some embodiments, the system application 537 includes computer-executable program code portions for instructing the processor 534 to perform any one or more of the functions of the system application 537 described and/or contemplated herein. In some embodiments, the system application 537 may include and/or use one or more network and/or system communication protocols.

In addition to the system application 537, the memory 536 also includes the structured database 538. As used herein, the structured database 538 may be one or more distinct and/or remote databases. In some embodiments, the structured database 538 is not located within the system and is instead located remotely from the system. In some embodiments, the structured database 538 stores information or data described herein.

It will be understood that the structured database 538 may include any one or more storage devices, including, but not limited to, datastores, databases, and/or any of the other storage devices typically associated with a computer system. It will also be understood that the structured database 538 may store information in any known way, such as, for example, by using one or more computer codes and/or languages, alphanumeric character strings, data sets, figures, tables, charts, links, documents, and/or the like. Further, in some embodiments, the structured database 538 may include information associated with one or more applications, such as, for example, the system application 537. It will also be understood that, in some embodiments, the structured database 538 provides a substantially real-time representation of the information stored therein, so that, for example, when the processor 534 accesses the structured database 538, the information stored therein is current or substantially current.

It will be understood that the embodiment of the system environment illustrated in FIG. 5 is exemplary and that other embodiments may vary. As another example, in some embodiments, the system 530 includes more, less, or different components. As another example, in some embodiments, some or all of the portions of the system environment 500 may be combined into a single portion. Likewise, in some embodiments, some or all of the portions of the system 530 may be separated into two or more distinct portions.

In addition, the various portions of the system environment 500 may be maintained for and/or by the same or separate parties. It will also be understood that the system 530 may include and/or implement any embodiment of the present invention described and/or contemplated herein. For example, in some embodiments, the system 530 is configured to implement any one or more of the embodiments of the process flows described and/or contemplated herein in connection any process flow described herein. Additionally, the system 530 or the user-input system 540 is configured to initiate presentation of any of the user-interfaces described herein.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

FIG. 6 illustrates an exemplary embodiment of a first user-interface 600, in accordance with one aspect of the invention. The first user-interface 600 includes server names 602, server parameters 604, event log 606, one or more server diagnostic functions 608, and an output 610. In some embodiments, the server names 602 may be used to list the names of one or more servers currently hosting the application. In one aspect, the one or more servers may be identified based on at least one or more search parameters associated with the application. In another aspect, the one or more servers may be identified based on at least a manual allocation of one or more servers to bear application load. In some embodiments, the server parameters 604 may enable the user to run diagnostic tests on the one or more servers to look for specific errors in the back-end system. In one aspect, one or more basic server diagnostics include ping status, port status, uptime, disk usage, and/or network parameters.

In some embodiments, the one or more server diagnostic functions include utilities, services, cluster information, memory/process, Internet Information Services (IIS), inventory, and certifications. In one aspect, the services option includes status information and service initiation parameters. The status information includes the status of service matching the server names listed under the server parameters. In some embodiments, the cluster information includes cluster status, cluster groups and status associated with the cluster groups.

FIGS. 7A, 7B, 7C, and 7D present an exemplary embodiment of a second interface in accordance with an embodiment of the invention 700. In some embodiments, the second user-interface includes a platform 702, search option 704, one or more application functions 706, an overview tab 708, a summary tab 710, a resolution tab 712, a known errors tab 713, and an attachment tab 714. In some embodiments, the information extracted from the one or more sources may be populated in the second user-interface to enable the user to begin an informed error resolution. In another embodiment, the information may be populated manually by one or more users. In one aspect, the platform option 702 lists one or more different platforms on which the application under review is hosted (e.g., online, stand-alone, or the like). The second user-interface enables the user to choose from a drop-down list of platform options to analyze the error associated with the application function. In some embodiments, the search option 704 enables the user to identify specific aspects of the application (e.g., component, contacts, summary, servers, personnel contact, known errors, or the like). In another embodiment, the one or more application functions 706 include the one or more functions associated with the application. In one aspect, the one or more application functions include one or more sub-functions. The second user-interface enables the user to select the one or more functions and/or sub-functions to analyze the specifics and determine which of the one or more functions and/or sub-functions require rectification.

Figure 7A:
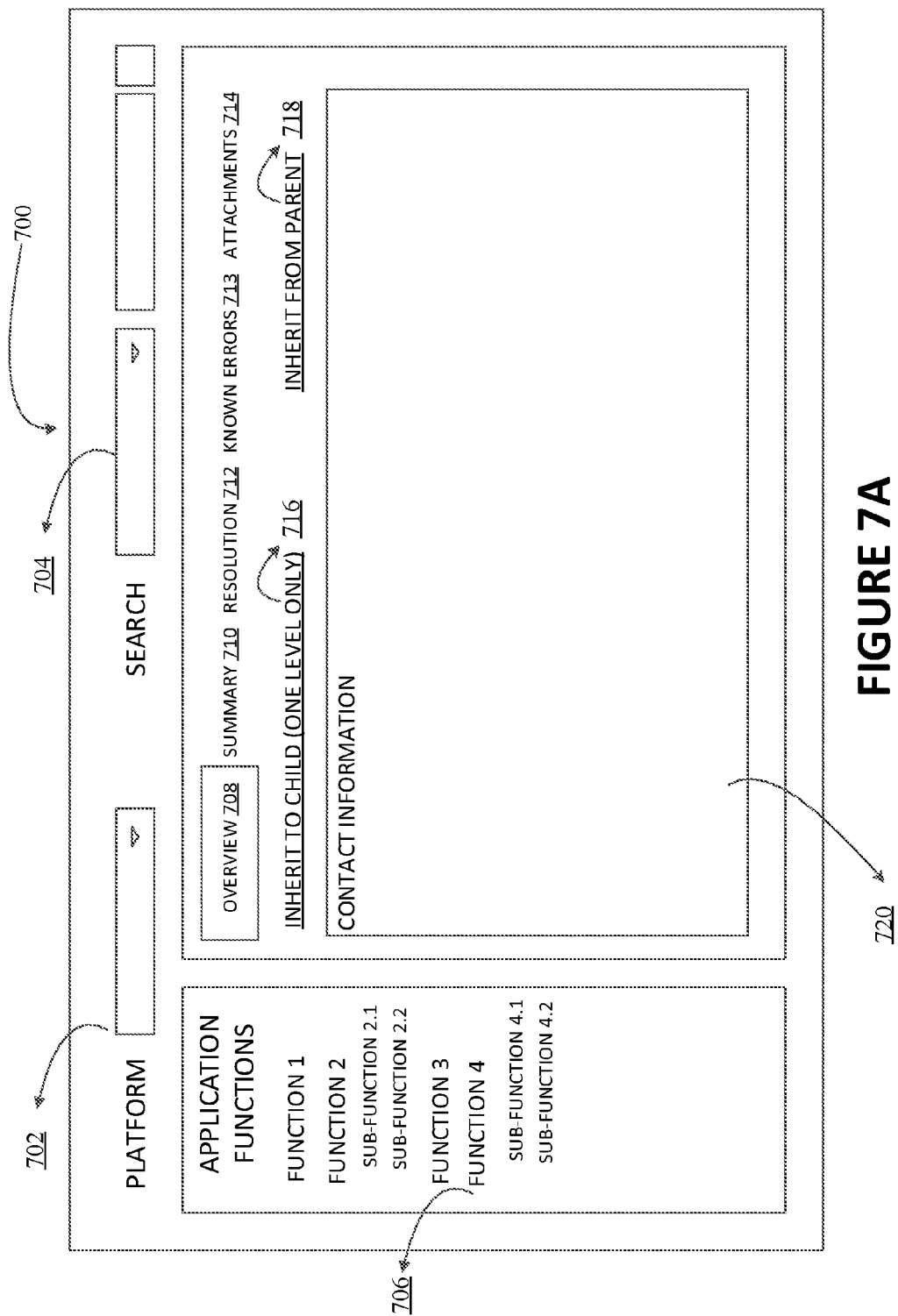

As shown in FIG. 7A, the overview tab 708 comprises an "inherit to child" function 716 and "inherit from parent" function 718. In one aspect, the "inherit to child" function 716 may be used to update the data in the overview page 708 of the current component/function to all its child components for only one level. This will ease the data uploading when the child components also need to reflect the same data. In another aspect, the "inherit from parent" function 718 may be used to collect the overview data from its parent component and update on the current component/function. This will be useful when only one child component share the same data as parent. In one aspect, the second user-interface illustrated in FIG. 7A includes a disable option (not shown) configured to mark the current component/function as disabled. After disabling, current components or the sub-components will be visible on the one or more applications function list 706. In some embodiments, the overview tab 708 includes one or more personnel contact information associated with the application, for example, vendor contact information, application development team, application deployment team, application engineering team, or the like.

Figure 7B:
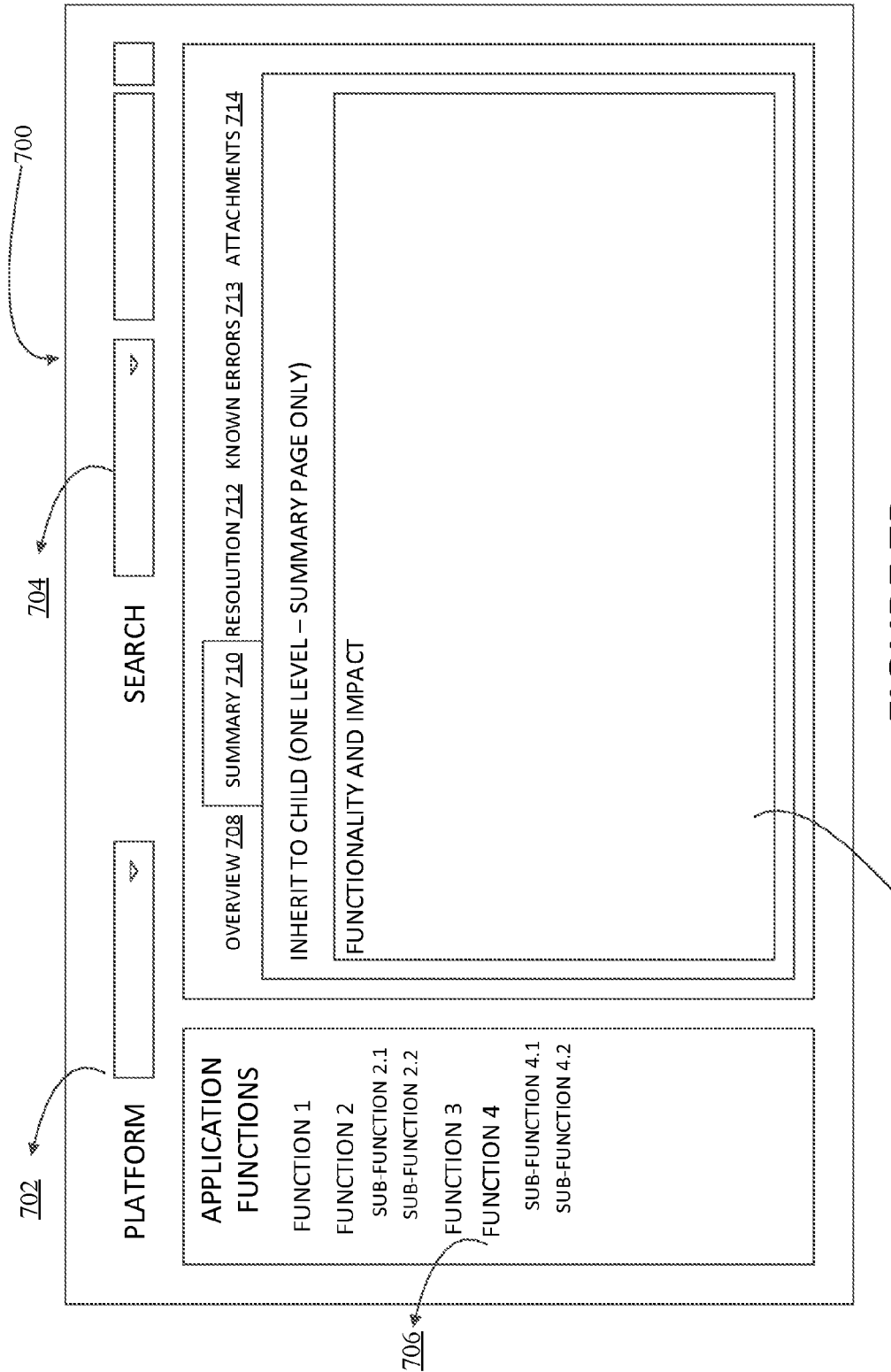
Figure 7C:
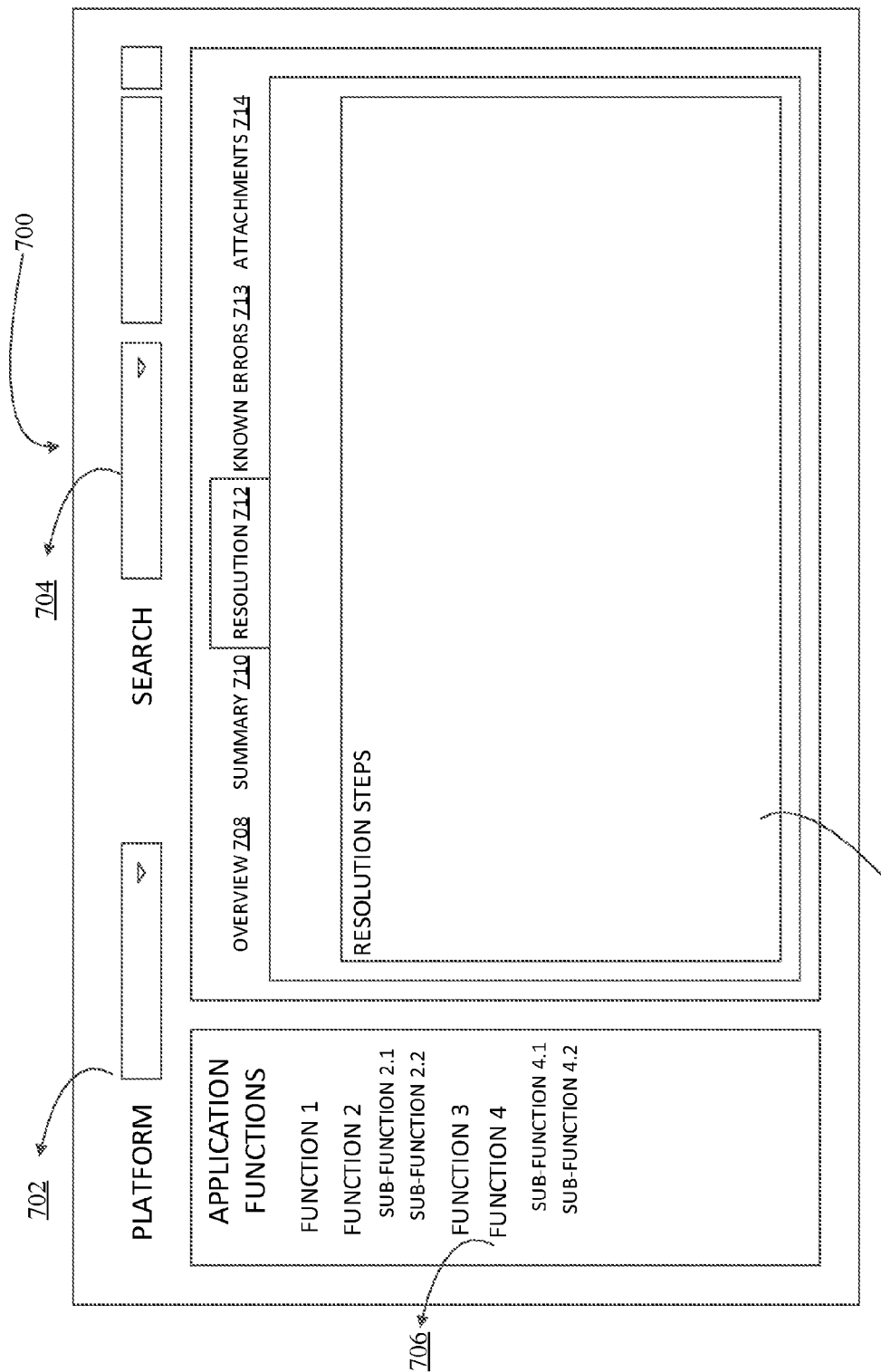
Figure 7D:
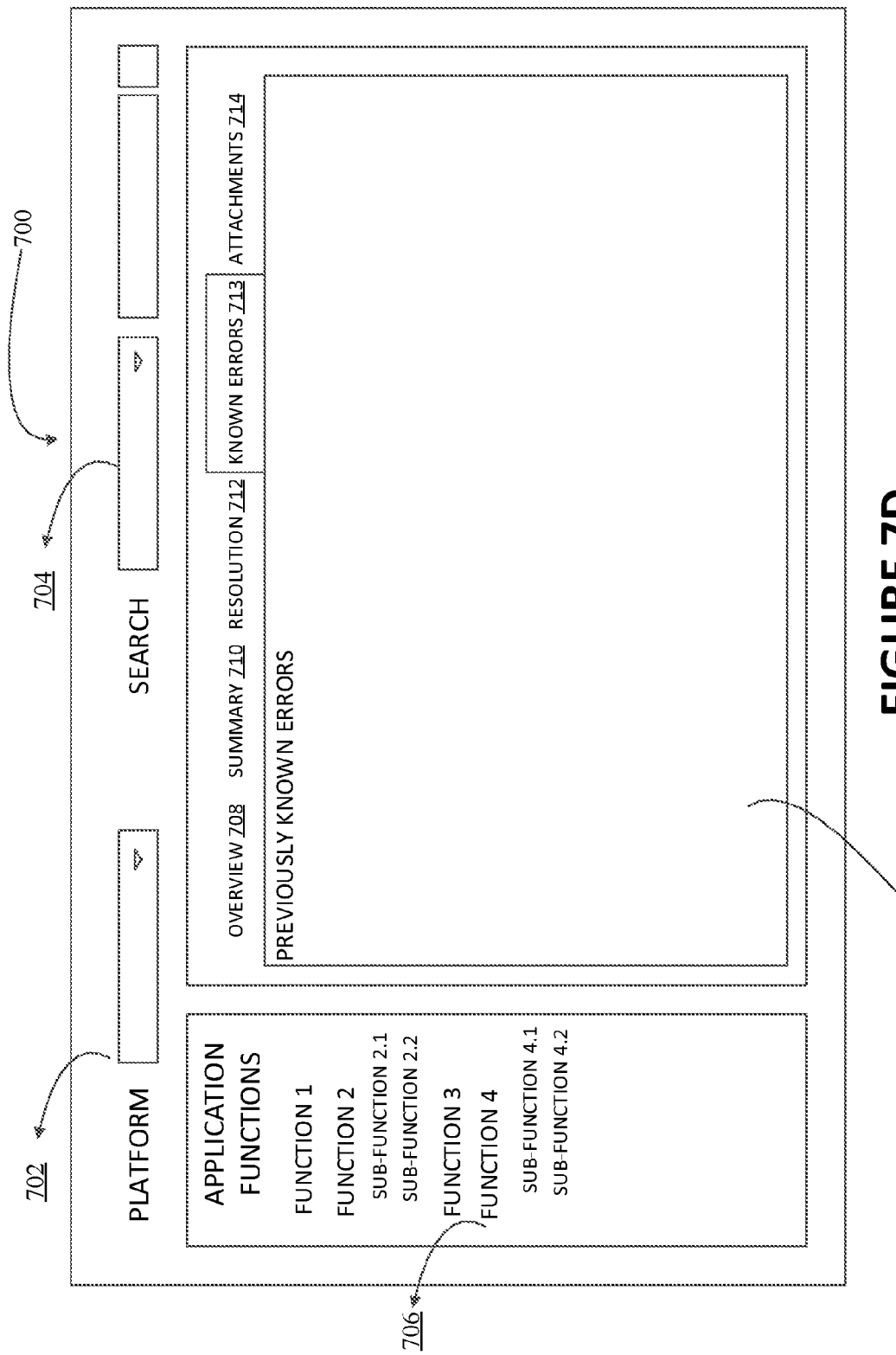
Figure 7E:
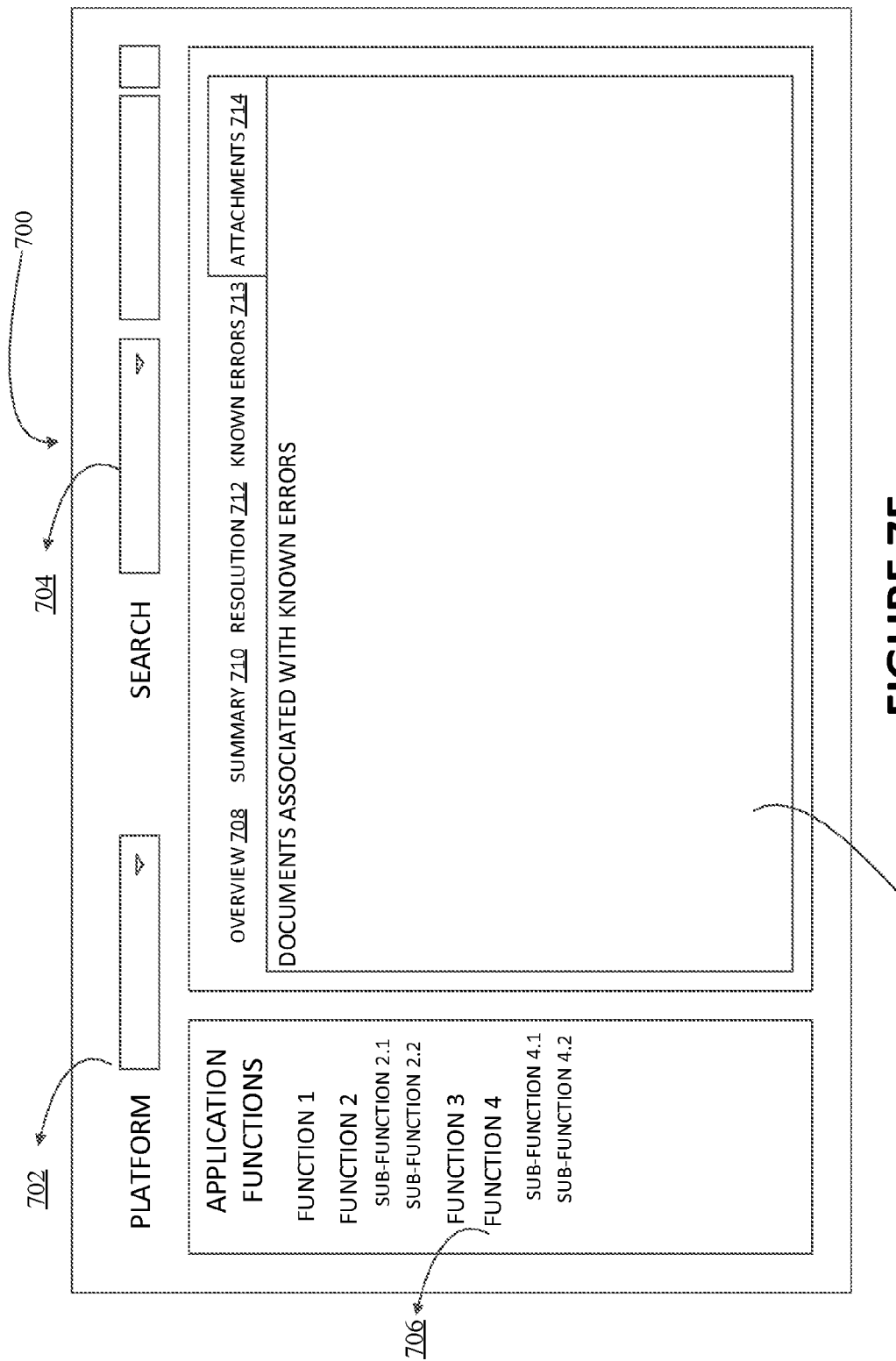

Referring now to FIG. 7B, the second user-interface 700 includes a summary of the error, the functionality of the one or more application functions under review, and/or, an impact assessment of the one or more errors, as shown in 722. Referring now to FIG. 7C, the second user-interface 700 includes one or more steps required to be followed to fix the one or more errors associated with the one or more application functions, as shown in 724. This may be determined based on previously known errors associated with the application, the one or more functions associated with the application, and the one or more sub-functions associated with the one or more functions. Referring now to FIG. 7D, the known errors tab 713 includes one or more previously known errors associated with the application. This may be used to enable the user to determine whether the received error is associated with any of the one or more known errors. Referring now to FIG. 7E, the attachment tab 714 includes one or more documents associated with the one or more known errors.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for assessing error notifications associated with one or more application functions and determining remediation steps to rectify the error, the system comprising:
 a memory;
 a processor; and
 a module stored in the memory, executable by the processor, and configured to:
  receive an indication of an error associated with at least one function in an application, wherein the application is dynamically hosted by one or more servers, wherein the one or more servers are associated with a back-end system;
  extract information associated with the application from one or more sources, wherein the information comprises at least one of one or more known errors associated with the at least one function, one or more resolutions associated with the one or more known errors, and/or impacts associated with the at least one function;
  determine that the error associated with the at least one function in the application is not associated with the back-end system;
  initiate an external communication with one or more vendors associated with the application indicating the error to determine that the error associated with the at least one function is to be resolved by the one or more vendors; and
  initiate a presentation of a second user-interface to enable a user to begin an error resolution process with the one or more vendors associated with the application to resolve the error, wherein the second user-interface comprises at least one of an aggregation of the information extracted from the one or more sources, a summary of the error, an error type, and/or access to one or more tools used to resolve the error.

2. The system of claim 1, wherein the module is configured to initiate a presentation of a first interface to:
 analyze the one or more servers hosting the application;
 identify an error, wherein the error identified in the one or more servers is associated with the error indicated in the at least one function in the application; and
 begin an error resolution process based on at least predetermined resolution functions associated with the one or more servers.

3. The system of claim 2, wherein analyzing one or more servers further comprises analyzing at least one of a utility, one or more services, server clustering information, and/or memory usage.

4. The system of claim 1, wherein the one or more sources comprises an internal source and an external source, wherein the internal source comprises at least one of application production statistics, internal communication reports, application documentation, and/or application production trials, wherein the external source comprises at least one of external communication reports, trade literature, and/or one or more databases associated with an application type.

5. The system of claim 1, wherein the module is configured to:
 aggregate the information from the one or more sources periodically; and store the aggregated information in a database associated with the application and configured to be retrievable by the user to be presented in the first user-interface.

6. The system of claim 1, wherein an application function comprises one or more application sub-functions, wherein the indication of an error associated with at least one application function comprises an error associated with one or more application sub-functions associated with the at least one application function.

7. The system of claim 1, wherein the first user-interface further comprises at least one of information associated with the application development team, application support team, and/or one or more vendors.

8. The system of claim 1, wherein module is configured to receive an indication of the error based on at least a real-time monitoring of the one or more application functions associated with the one or more applications.

9. A method for assessing error notifications associated with one or more application functions and determining remediation steps to resolve the error, the method comprising:
   receiving, using a computing device processor, an indication of an error associated with at least one function in an application, wherein the application is dynamically hosted by one or more servers, wherein the one or more servers are associated with a back-end system;
   extracting, using a computing device processor, information associated with the application from one or more sources, wherein the information comprises at least one of one or more known errors associated with the at least one function, one or more resolutions associated with the one or more known errors, and/or impacts associated with the at least one function; and
   determining, using a computing device processor, that the error associated with the at least one function in the application is not associated with the back-end system;
   initiating, using a computing device processor, an external communication with one or more vendors associated with the application indicating the error to determine that the error associated with the at least one function is to be resolved by the one or more vendors; and
   initiating, using a computing device processor, a presentation of a second user-interface to enable a user to begin an error resolution process with the one or more vendors associated with the application to resolve the error, wherein the second user-interface comprises at least one of an aggregation of the information extracted from the one or more sources, a summary of the error, an error type, and/or access to one or more tools used to resolve the error.

10. The method of claim 9, wherein the method further comprises initiating a presentation of a first interface to:
   analyze the one or more servers hosting the application; and
   identify an error, wherein the error identified in the one or more servers is associated with the error indicated in the at least one function in the application.

11. The method of claim 10, wherein analyzing one or more servers further comprises analyzing at least one of a utility, one or more services, server clustering information, and/or memory usage.

12. The method of claim 9, wherein the method further comprises:
   aggregating the information from the one or more sources periodically; and
   storing the aggregated information in a database associated with the application and configured to be retrievable by the user to be presented in the first user-interface.

13. The method of claim 9, wherein an application function comprises one or more application sub-functions, wherein the indication of an error associated with at least one application function comprises an error associated with one or more application sub-functions associated with the at least one application function.

14. The method of claim 9, wherein the first user-interface further comprises at least one of information associated with the application development team, application support team, and/or one or more vendors.

15. The method of claim 9, wherein method further comprises receiving an indication of the error based on at least a real-time monitoring of the one or more application functions associated with the one or more applications.

16. A computer program product for assessing error notifications associated with one or more application functions and determining remediation steps to resolve the error, the computer program product comprising a non-transitory computer-readable medium comprising code causing a first apparatus to:
   receive an indication of an error associated with at least one function in an application, wherein the application is dynamically hosted by one or more servers, wherein the one or more servers are associated with a back-end system;
   extract information associated with the application from one or more sources, wherein the information comprises at least one of one or more known errors associated with the at least one function, one or more resolutions associated with the one or more known errors, and/or impacts associated with the at least one function;
   determine that the error associated with the at least one function in the application is not associated with the back-end system;
   initiate an external communication with one or more vendors associated with the application indicating the error to determine that the error associated with the at least one function is to be resolved by the one or more vendors; and
   initiate a presentation of a second user-interface to enable a user to begin an error resolution process with the one or more vendors associated with the application to resolve the error, wherein the second user-interface comprises at least one of an aggregation of the information extracted from the one or more sources, a summary of the error, an error type, and/or access to one or more tools used to resolve the error.

17. The computer program product of claim 16, wherein the first apparatus is further configured to initiate a first user-interface to:
   analyze the one or more servers hosting the application; and
   identify an error, wherein the error identified in the one or more servers is associated with the error indicated in the at least one function in the application.

18. The computer program product of claim 17, wherein analyzing one or more servers further comprises analyzing at least one of a utility, one or more services, server clustering information, and/or memory usage.

* * * * *